(12) United States Patent
Un et al.

(10) Patent No.: US 8,095,988 B2
(45) Date of Patent: Jan. 10, 2012

(54) FORGERY-PROOF DIGITAL SOUND RECORDING DEVICE

(75) Inventors: Sungkyong Un, Daejeon (KR); Dowon Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 606 days.

(21) Appl. No.: 12/212,795

(22) Filed: Sep. 18, 2008

(65) Prior Publication Data

US 2009/0144831 A1  Jun. 4, 2009

(30) Foreign Application Priority Data

Dec. 4, 2007 (KR) .................. 10-2007-0124800

(51) Int. Cl.
*G11B 15/04* (2006.01)
*G06F 17/30* (2006.01)
(52) U.S. Cl. .................................. 726/26; 360/60
(58) Field of Classification Search .............. 726/26
See application file for complete search history.

(56) References Cited

U.S. PATENT DOCUMENTS

| | | | | |
|---|---|---|---|---|
| 6,512,836 B1 * | 1/2003 | Xie et al. | ............. | 382/100 |
| 7,333,768 B1 * | 2/2008 | Coltman et al. | ............. | 434/317 |
| 7,515,978 B2 * | 4/2009 | Sugiyama | ............. | 700/94 |
| 2005/0094516 A1 | 5/2005 | Morimoto et al. | | |
| 2006/0041585 A1 * | 2/2006 | Ebihara et al. | ............. | 707/104.1 |
| 2006/0087950 A1 | 4/2006 | Linnartz | | |
| 2006/0095381 A1 * | 5/2006 | Yokota et al. | ............. | 705/57 |
| 2006/0173564 A1 * | 8/2006 | Beverly | ............. | 700/94 |
| 2006/0200414 A1 * | 9/2006 | Roberts | ............. | 705/50 |
| 2006/0271796 A1 * | 11/2006 | Kaimal et al. | ............. | 713/194 |

FOREIGN PATENT DOCUMENTS

| | | |
|---|---|---|
| JP | 04-284554 A | 10/1992 |
| JP | 2002-015511 A | 1/2002 |
| JP | 2003-178536 A | 6/2003 |
| JP | 2003-217228 A | 7/2003 |
| JP | 2004-047041 A | 2/2004 |
| JP | 2005-135513 A | 5/2005 |
| JP | 2006-513520 T | 4/2006 |
| JP | 2006-294026 A | 10/2006 |
| KR | 2004-0033609 A | 4/2004 |
| KR | 2004-0083957 A | 10/2004 |
| KR | 2006-0123882 A | 12/2006 |

OTHER PUBLICATIONS

Zmudzinski et al., "Psycho-acoustic Model-based Message Authentication Coding for Audio Data", Sep. 2008, ACM, pp. 75-84.*

* cited by examiner

*Primary Examiner* — Matthew Smithers
(74) *Attorney, Agent, or Firm* — Ladas & Parry LLP

(57) ABSTRACT

The present invention provides a digital sound recording device that prevents data stored as digital sound data from being forged. A digital sound recording device according to the present invention includes an input unit, a storage unit, a data communication unit, a processor, and a write protection unit that is provided between the storage unit and the data communication unit, thereby preventing the write control from being performed on the storage unit by the external unit.

4 Claims, 4 Drawing Sheets

FORGERY-PROOF DIGITAL SOUND RECORDING DEVICE

RELATED APPLICATIONS

The present application claims priority to Korean Patent Application Serial Number 10-2007-0124800, filed on Dec. 4, 2007, the entirety of which is hereby incorporated by reference.

BACKGROUND OF THE INVENTION

1. Field of the Invention

The present invention relates to a digital sound recording device, such as a digital sound recorder, a mobile phone, and a wireless telephone, that records sound as digital data and includes additional units to prevent sound record from being forged, thereby improving admissibility of evidence.

This work was supported by the IT R&D program of MIC/IITA [2007-S-019-01, Development of Digital Forensic System for Information Transparency].

2. Description of the Related Art

A digital sound recording device is a device for storing human voice or sound as digital files, and is referred to as a digital sound recorder, a voice recorder, or the like. The digital sound recording device also includes different devices, which are provided with a recording unit, such as a mobile phone and a wireless telephone.

When there is a legal argument about a specific case, recorded data is submitted to the court as evidence in order to prove whether facts of the case are present or not. Recorded data is used as advantageous evidence. In this case, a digital sound recording device is widely used.

However, since the recorded data of the digital sound recording device is also digital data, it is not free from forgery.

In particular, in recent years, digital files are very easily edited using a computer, and sound data can be realistically modified and composed using excellent programs so that it is not possible to discriminate whether the data is forged. For this reason, it is difficult to prove that the recorded digital data is original data without forgery.

SUMMARY OF THE INVENTION

Accordingly, it is an object of the present invention to provide a device that additionally includes specific circuits or programs in addition to a digital sound recording device to protect digital sound record from forgery and to confirm whether the data is genuine, and a method using the device.

In order to achieve the above-mentioned object, according to an embodiment of the present invention, a digital sound recording device includes a sound input unit, a storage unit, a data communication unit, a processor, and a write protection unit. Sound is input to the sound input unit. The storage unit stores the input sound as digital sound data. The data communication unit performs data communication with an external unit. The processor controls the storage unit so that the sound input from the sound input unit is stored in the storage unit as digital sound data, and controls the data communication unit so that the digital sound data stored in the storage unit is transmitted and received to/from the external unit through the data communication unit. The write protection unit is provided between the storage unit and the data communication unit. The write protection unit prevents the write control from being performed on the storage unit by the external unit.

Further, the digital sound recording device may further include a MAC (message authentication code) generator. When digital sound data is stored in the storage unit, the MAC generator generates a MAC corresponding to the digital sound data and stores the MAC in the storage unit.

Furthermore, the MAC may be generated on the basis of a hardware identifier of the digital sound recording device.

Furthermore, the MAC is incorporated in the corresponding digital sound data.

In order to achieve the above-mentioned object, according to another embodiment of the present invention, a digital sound recording device includes a sound input unit, a storage unit, a data communication unit, a processor, and a MAC (message authentication code) generator. Sound is input to the sound input unit. The storage unit stores the input sound as digital sound data. The data communication unit performs data communication with an external unit. The processor controls the storage unit so that the sound input from the sound input unit is stored in the storage unit as digital sound data, and controls the data communication unit so that the digital sound data stored in the storage unit is transmitted and received to/from the external unit through the data communication unit. When digital sound data is stored in the storage unit, the MAC generator generates a MAC corresponding to the digital sound data and stores the MAC in the storage unit.

Further, the MAC may be generated on the basis of a hardware identifier of the digital sound recording device.

In the case of a digital sound recording device having credibility in respects to improved admissibility of evidence, data cannot be fabricated outside due to a write protection unit. Accordingly, when the sound recording device is produced as evidence, there may be free from the controversy about the forgery of recorded data. Further, when the recorded data stored in the storage unit is utilized outside the device, it is possible to prove that the data is identical with original data stored in the digital sound recording device by using message authentication codes. Therefore, the digital sound recording device can be used for various purposes.

DESCRIPTION OF THE PREFERRED EMBODIMENTS

Preferred embodiments of the present invention will be described with reference to accompanying drawings.

Figure 1:
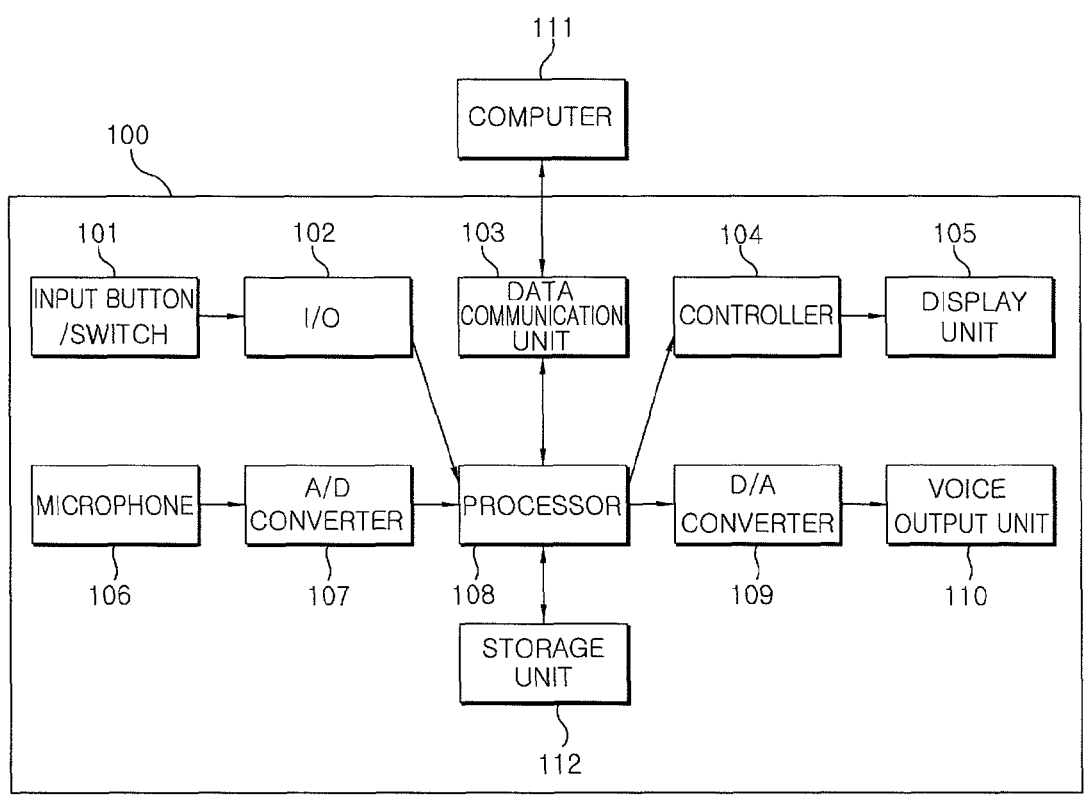
FIG. 1 is a block diagram of a digital sound recording device in the related art.

First, the configuration of a general digital sound recording device, which is currently used, will be described with reference to FIG. 1.

A digital sound recording device 100 includes a microphone 106, an A/D converter 107, a storage unit 112, a D/A converter 109, a voice output unit 110, an input button/switch 101, an I/O unit 102, a controller 104, a display unit 105, a data communication unit 103, and a processor 108. The microphone 106 converts sound into an electrical signal. The A/D converter 107 converts the electrical signal into digital sound data. The storage unit 112 stores the converted digital sound data. The D/A converter 109 converts the stored digital sound data into an analog signal. The voice output unit 110 converts the analog signal into sound. The input button/switch 101 is operated by a user. The I/O unit 102 converts the operation of the button or switch into an electrical signal. The controller 104 controls the screen of an LCD and the like. The display unit 105 is controlled by the controller and displays images, letters, and the like. The data communication unit 103 performs data communication with an external computer. The processor 108 controls the above-mentioned components of the digital sound recording device.

A user begins to perform recording by operating the input button/switch 101, and human voice or sound is stored in the storage unit 112 through the microphone 106, the A/D converter 107, and the processor 108. In this case, the processor 108 may store the digital sound data, which is converted by the A/D converter, in the storage unit 112 as it is. Alternatively, the processor may compress the digital sound data by compression algorithm, and then store the compressed data in the storage unit 112 to use efficiently the storage unit. The user can confirm the progress of the recording, the size of the recorded sound data, and the number of recorded files by using the display unit 105. The user can select specific sound data to confirm the recorded sound by using the display unit 105 and the input button/switch 101. The processor 108 reads the selected digital sound data from the storage unit 112, and controls the D/A converter 109 so that the selected digital sound data is converted into an analog signal. The voice output unit 110 converts the analog signal into audible sound.

Further, the digital sound recording device 100 may further include a data communication unit 103. The data communication unit allows the digital sound recording device to communicate with an external computer 111 so that the digital sound data can be utilized outside the device. Accordingly, the digital sound data stored in the storage unit 112 can be transmitted to an external unit, for example, the computer 111 by the data communication unit. Further, digital sound data stored in the external unit can be transmitted to the storage unit 112 by the data communication unit, and then stored in the storage unit. When the digital sound recording device communicates with the computer 111 as described above, it is possible to delete or store the sound data stored in the storage unit 112. When this sound data is produced in a trial as evidence, there may be controversy about the forgery of the sound data.

A digital sound recording device 200 according to an embodiment of the present invention will be described with reference to FIG. 2. The digital sound recording device 200 has the configuration similar to the general digital sound recording device 100. However, the digital sound recording device 200 further includes a write protection unit 213 that is provided between a computer 211, that is, an external unit and a storage unit 212, which is different from the general digital sound recording device 100. The write protection unit 213 functions to interrupt deletion and storage instructions from the external computer 211, and functions to admit only a read instruction. The write protection unit may be composed of an electronic circuit. Alternatively, the write protection unit may be composed of a program code that is executed in a processor 208 or other processors different from the processor 208.

When digital sound data stored in the storage unit 212 is transmitted to the computer 211, the digital sound data stored in the storage unit 212 is transmitted to the computer 211 through the processor 208 and a data communication unit 203. Since this operation corresponds to "read" in the position of the computer 211, the write protection unit 213 admits this operation.

However, when the digital sound data is stored in the storage unit 212 from the computer 211, the digital sound data transmitted through the data communication unit 203 and the write protection unit 213 recognizes this operation as "store". Therefore, the write protection unit 213 interrupts that the digital sound data is stored in the storage unit 212 from the computer 211. Further, the write protection unit 213 may interrupt a "delete" instruction from the external unit. For this reason, the digital sound data stored in the storage unit 212 can be protected from the access of the computer 211.

Accordingly, the digital sound data, which is fabricated outside the device, cannot be stored in the write protected digital sound recording device 200. Therefore, when the digital sound data stored in the digital sound recording device 200 is produced as evidence, it is possible to prove that this digital sound data is not fabricated.

Another embodiment of the present invention will be described with reference to FIG. 3. A digital sound recording device 300 shown in FIG. 3 further includes a MAC (message authentication code) generator 314, which is provided between a processor 308 and a storage unit 312, in addition to the components of the general digital sound recording device.

A MAC means an authentication code, which is used to confirm whether messages are changed or credible in order to prove the integrity of the messages. In general, a MAC value of a specific message m (that is, MAC=H(K, m)) is generated using a private key K and MAC generation algorithm H. If the message has been changed, a MAC value of the changed message does not correspond to an existing MAC value. Therefore, it is possible to easily verify that the message has been changed. Further, since it is not possible to restore the message from the MAC value, it is possible to easily and credibly prove the integrity of the message.

Figure 3:
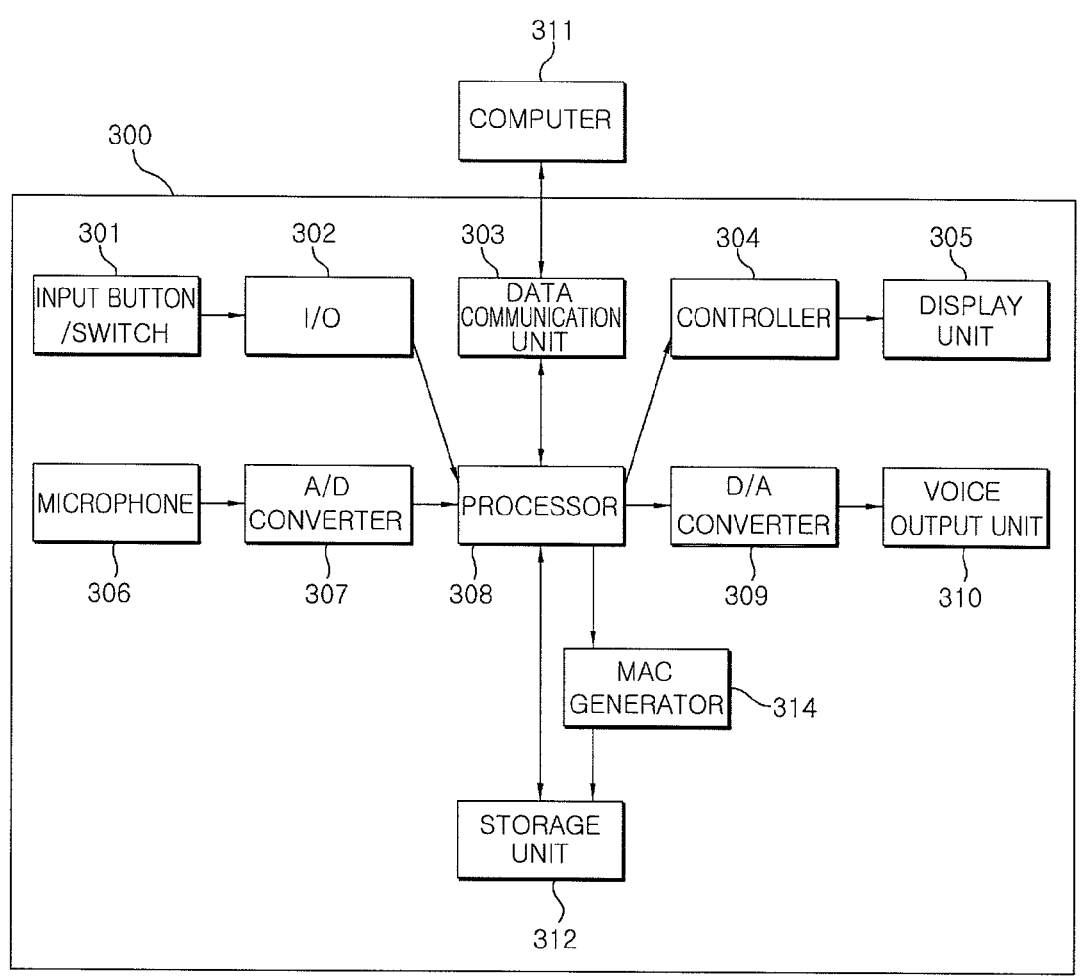
FIG. 3 is a block diagram of a digital sound recording device according to another embodiment of the present invention.

Referring to FIG. 3, the MAC generator 314 generates authentication codes of all of the specific digital sound data. A block cipher or hash function, which has been already tested, is preferably used as the MAC generation algorithm. A key, which is known only to a maker, is preferably used as the private key. For example, a value, which has an eigenvalue such as a hardware identifier of the digital sound recording device 300 and is known only to a maker, may be used as the key. When an external user intends to fabricate recorded data stored in the storage unit 312 or to generate a message authentication code of not data recorded by the digital sound recording device 300 but data recorded by another device, only an authentication code different from the message authentication code capable of being generated from the digital sound recording device 300 is generated because the external user cannot know the key. Therefore, it is possible to confirm whether the data is genuine, by comparing the codes.

The MAC generated by the MAC generator 314 may be stored in the storage unit 312 as an additional item of the recorded digital sound data, or may be stored as an independent file different from the digital sound data. Further, the MAC can be encoded so that the MAC is associated with the digital sound data and the only the MAC cannot be extracted.

When the digital sound data is generated using digital sound recording device 300, the data fabricated externally is different from the original digital sound data in terms of a MAC value. Accordingly, it is possible to determine whether the data is identical with the original digital sound data, by simply comparing the MACs of both data. As a result, it is possible to easily and accurately determine whether the data is genuine.

Figure 4:
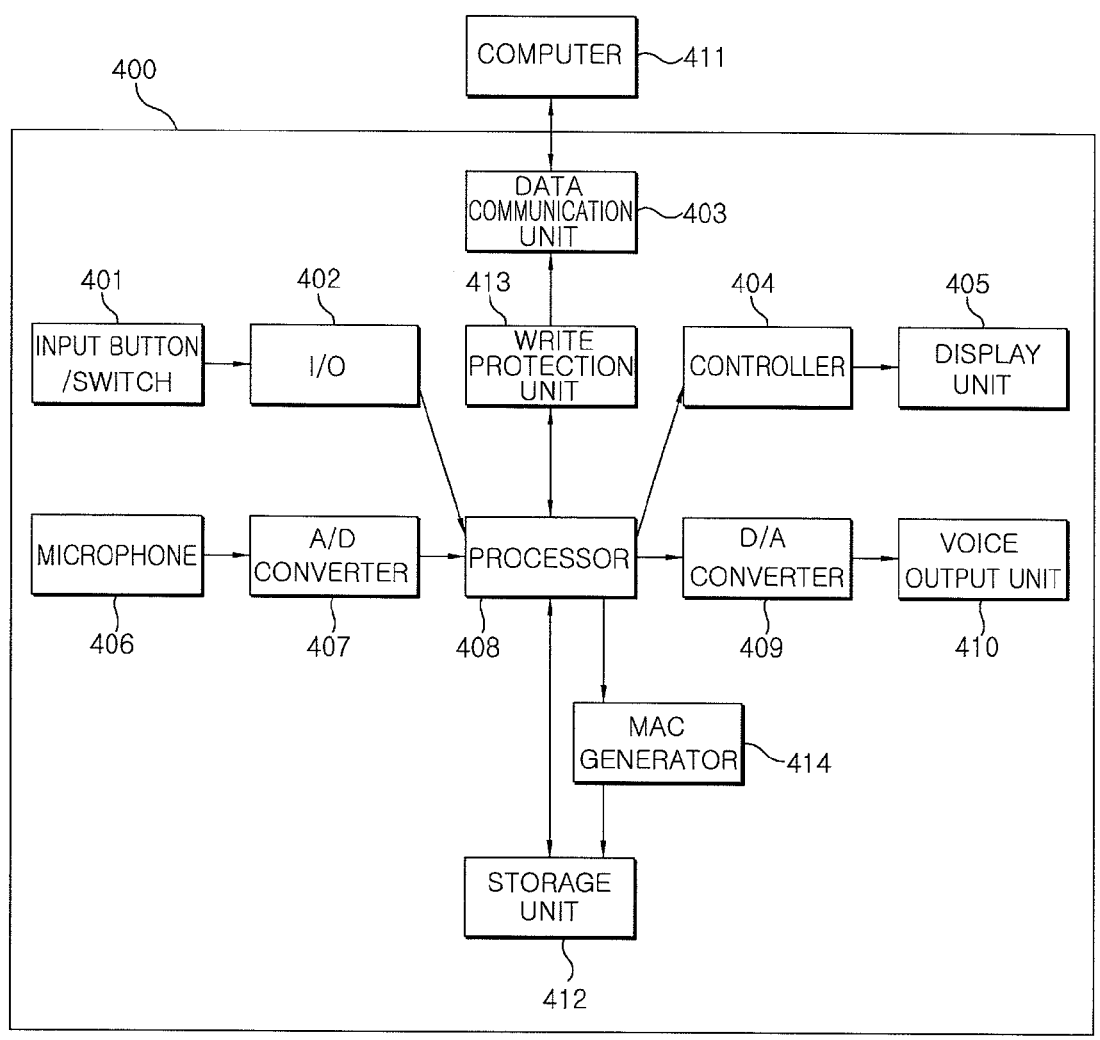
FIG. 4 is a block diagram of a digital sound recording device according to still another embodiment of the present invention.

Still another embodiment of the present invention will be described with reference to FIG. 4. A digital sound recording device 400 shown in FIG. 4 further includes a write protection unit 413 that is provided between a computer 411 and a storage unit 412, and a MAC generator 414 that is provided between a processor 408 and the storage unit 412, in addition to the components of the general digital sound recording device 100.

Figure 2:
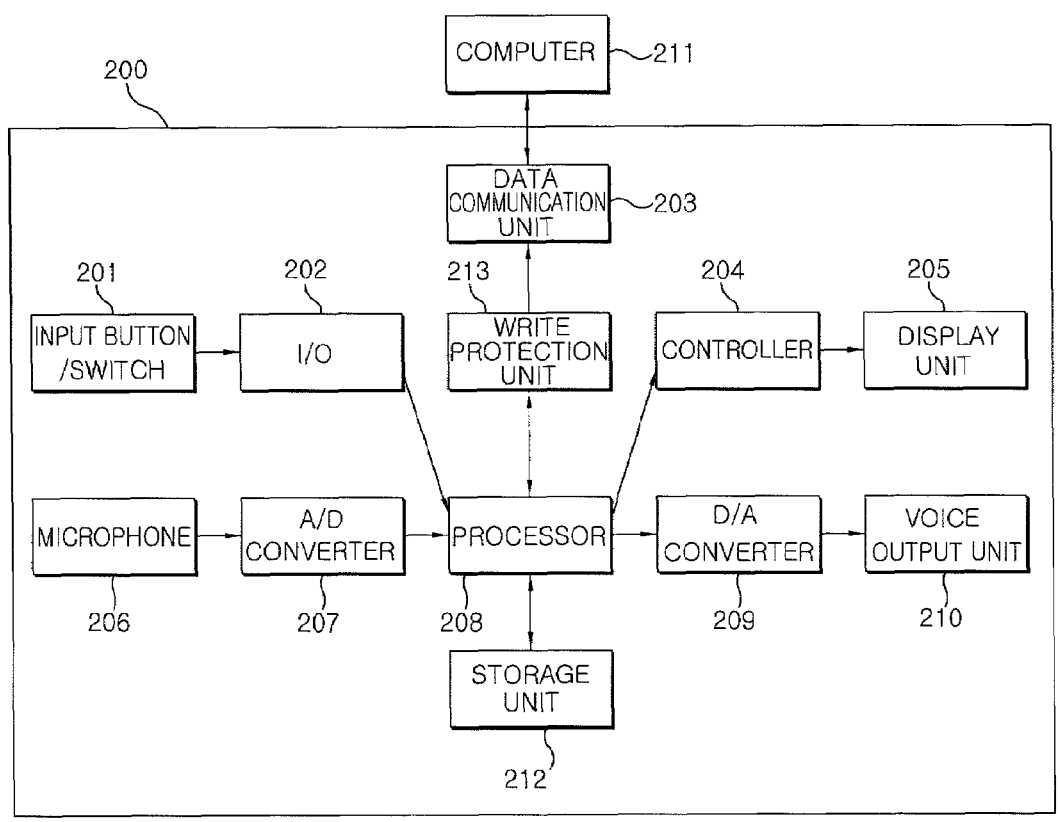
FIG. 2 is a block diagram of a digital sound recording device according to an embodiment of the present invention.

The write protection unit 413 has the same function as the write protection unit 213 of FIG. 2. That is, the write protection unit prevents the digital sound data, which is transmitted from an external computer 411, from being stored in the storage unit. Further, the write protection unit prevents the digital sound data, which is stored in the storage unit, from being changed by the computer 411.

In addition, a MAC generator 414 generates a MAC of the digital sound data to be stored in the storage unit. As described above, the MAC may be added to the digital sound data, separately stored, or associated with the digital sound data in the encoded form.

When the digital sound recording device 400 is used, the digital sound data fabricated externally cannot be stored in the digital sound recording device. Therefore, when the digital sound data stored in the digital sound recording device 400 is produced as evidence, it is possible to prove that this digital sound data is not fabricated. Further, since the data fabricated outside the device has a MAC value different from that of the original digital sound data, it is possible to forge the digital sound data outside the device. Furthermore, it is possible to determine whether the data is identical with the original digital sound data, through the simple comparison between the MAC values of data. As a result, it is possible to easily and accurately determine whether the data is genuine.

The digital sound recording device according to the present invention is not limited to the above-mentioned embodiments, and may be modified in various ways without departing from the scope of the present invention. The external units mentioned as the computers 211, 311, and 411 may be other kinds of units that are connected to the digital sound recording device outside the device. As long as a digital sound recording device has the above-mentioned characteristic configuration, a process for recording and playing back digital sound data in the digital sound recording device may be modified in various ways. The write protection unit can prevent the writing by using hardware or programs.

What is claimed is:

1. A digital sound recording device comprising:
   a sound input unit to which sound is input;
   a storage unit that stores the input sound as digital sound data;
   a data communication unit that performs data communication with an external unit; and
   a processor controlling the storage unit so that input sound is stored in the storage unit as digital sound data, and controlling the data communication unit so that the digital sound data is transmitted and received to/from the external unit through the data communication unit; and
   a write protection unit that is provided between the storage unit and the data communication unit,
   wherein the write protection unit prevents the external unit from performing write control on the storage unit by interrupting deletion and storage instructions from the external unit.

2. The digital sound recording device according to claim 1, further comprising:
   a MAC (message authentication code) generator,
   wherein when digital sound data is stored in the storage unit, the MAC generator generates a MAC corresponding to the digital sound data and stores the MAC in the storage unit.

3. The digital sound recording device according to claim 2, wherein the MAC is generated on the basis of a hardware identifier of the digital sound recording device.

4. The digital sound recording device according to claim 2, wherein the MAC is incorporated in the corresponding digital sound data.

* * * * *